United States Patent [19]

Kierzkowski et al.

[11] Patent Number: 5,057,129
[45] Date of Patent: Oct. 15, 1991

[54] MOISTURE SEPARATOR

[75] Inventors: Frank J. Kierzkowski, Bedford; Dudley R. Cornwell, Dallas, both of Tex.

[73] Assignee: Peerless Manufacturing Company, Dallas, Tex.

[21] Appl. No.: 490,485

[22] Filed: Mar. 8, 1990

Related U.S. Application Data

[63] Continuation-in-part of Ser. No. 374,145, Jun. 30, 1989, abandoned, which is a continuation of Ser. No. 69,710, Jul. 6, 1987, Pat. No. 4,854,950.

[51] Int. Cl.$^5$ .............................................. B01D 29/02
[52] U.S. Cl. ...................................... 55/213; 55/309; 55/311; 55/312; 55/422
[58] Field of Search ................... 55/21, 213, 309, 314, 55/422, 478–481, 212

[56] References Cited

U.S. PATENT DOCUMENTS

| | | | |
|---|---|---|---|
| 1,666,756 | 4/1922 | Sass | 210/131 |
| 1,914,667 | 6/1933 | Kolla | 55/313 |
| 2,135,750 | 11/1938 | Harding | 55/493 X |
| 2,303,333 | 2/1940 | Dauphinee | 55/312 |
| 2,575,499 | 11/1951 | Manow | 55/422 |
| 2,783,786 | 3/1957 | Carter | 55/309 X |
| 3,353,551 | 11/1967 | Smale | 55/312 X |
| 3,410,288 | 11/1968 | Hajek | 55/312 X |
| 3,411,272 | 2/1966 | Carmon | 55/274 |
| 3,421,296 | 1/1969 | Baurer, Sr. | 55/306 |
| 3,593,503 | 7/1971 | Andrews | 55/481 |
| 3,612,024 | 10/1971 | Bandimere | 55/312 X |
| 3,733,814 | 5/1973 | Hull, Jr. et al. | 55/422 X |
| 3,823,532 | 7/1974 | Cooper et al. | 55/357 |
| 3,841,259 | 10/1974 | Parkinson et al. | 116/70 |
| 3,869,266 | 3/1975 | Rannenberg | 55/309 |
| 4,081,255 | 3/1978 | Evans | 55/230 |
| 4,231,769 | 11/1980 | Ahlrich | 55/342 |
| 4,300,918 | 11/1981 | Cary | 55/1 |
| 4,312,645 | 1/1982 | Mavros et al. | 55/213 |
| 4,361,423 | 11/1982 | Nitz | 55/100 |
| 4,698,078 | 10/1987 | Mavros | 55/213 |
| 4,854,950 | 8/1989 | Kierzkowski et al. | 55/213 |

FOREIGN PATENT DOCUMENTS

| | | | |
|---|---|---|---|
| 0085576 | 8/1983 | European Pat. Off. . | |
| 0087229 | 8/1983 | European Pat. Off. . | |
| 433056 | 8/1926 | Fed. Rep. of Germany | 55/313 |
| 875287 | 4/1953 | Fed. Rep. of Germany | 55/309 |
| 8603424 | 6/1986 | PCT Int'l Appl. . | |
| 8603557 | 6/1986 | World Int. Prop. O. . | |
| 2136311 | 9/1984 | United Kingdom | 55/309 |
| 2158732 | 11/1985 | United Kingdom . | |
| 2182582 | 5/1987 | United Kingdom . | |

OTHER PUBLICATIONS

Bath Iron Works Corporation, "Purchase Specification for DDG51 Program Moisture Separator/Blow-In Panel Sets", Apr. 30, 1986.

Primary Examiner—Robert Spitzer
Attorney, Agent, or Firm—Richards, Medlock & Andrews

[57] ABSTRACT

A moisture separator (10, 150, 200) is provided for filtering air being provided to a marine power plant. If the moisture separator becomes clogged, reducing air flow, a vacuum sensing switch (108) is closed to power panels (18, 20) to an opened position, permitting air to bypass the filtering elements of the moisture separator and flow directly to the power plant. The doors can be powered shut and latched in either position. A de-icing manifold (206) serves a dual function of spraying a de-icing fluid on the panels and also acts as a frame for the latching mechanism to hold a panel in an open position.

3 Claims, 13 Drawing Sheets

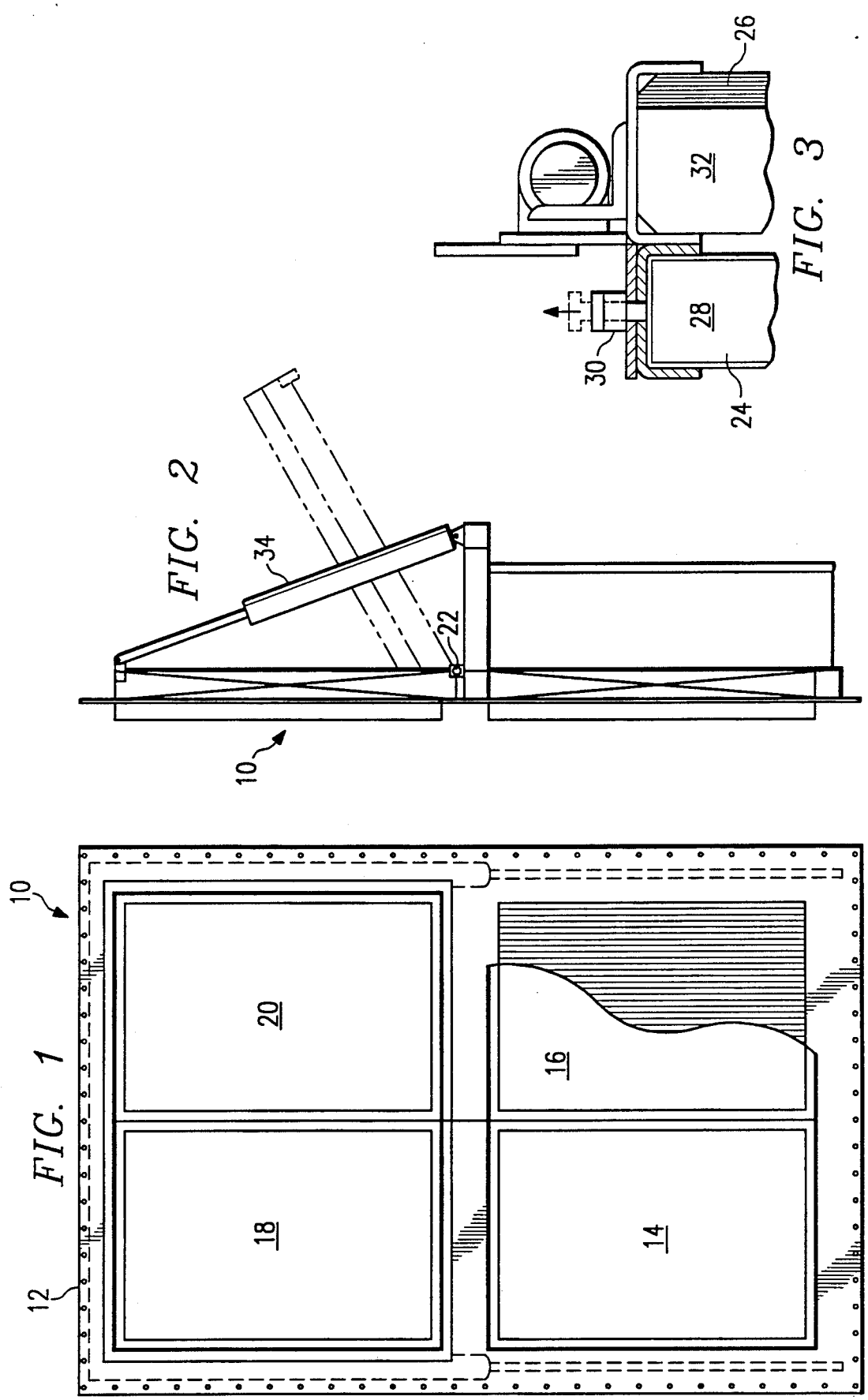

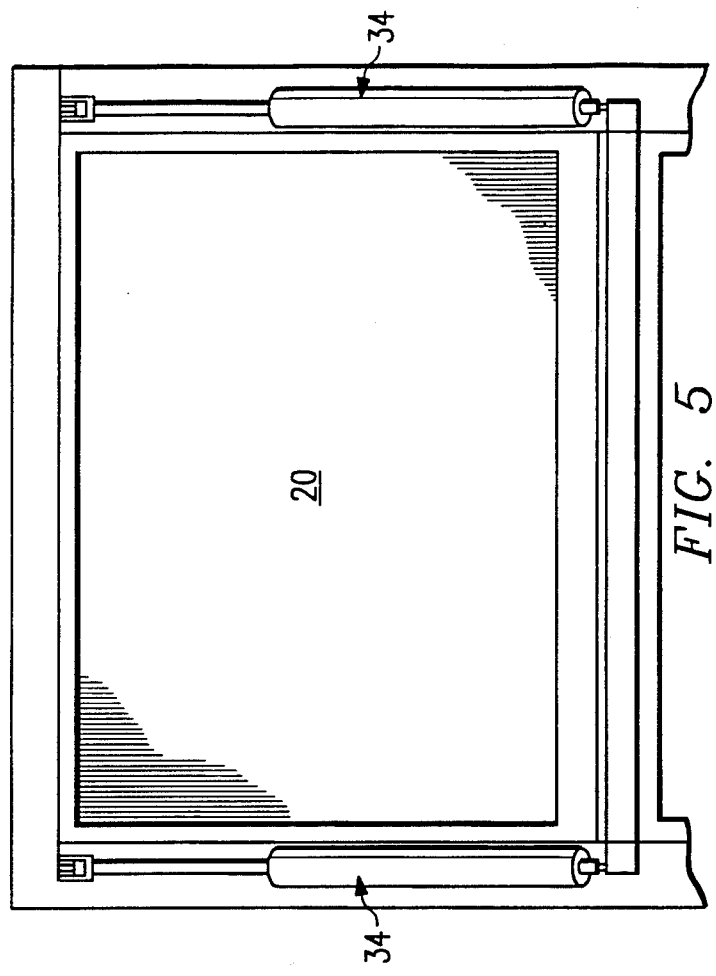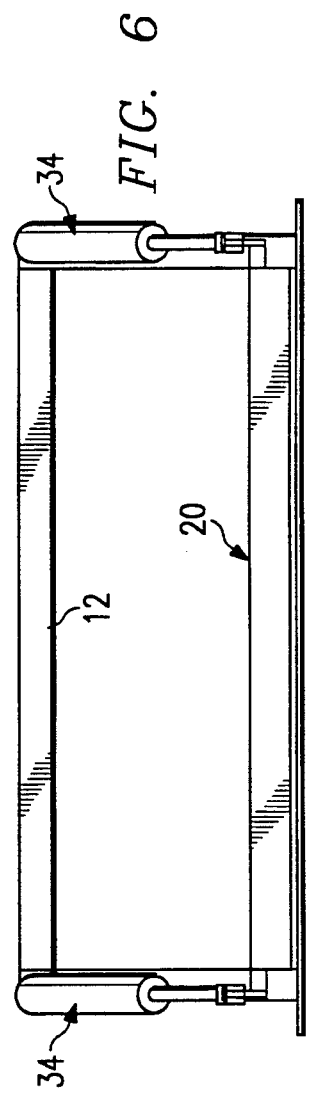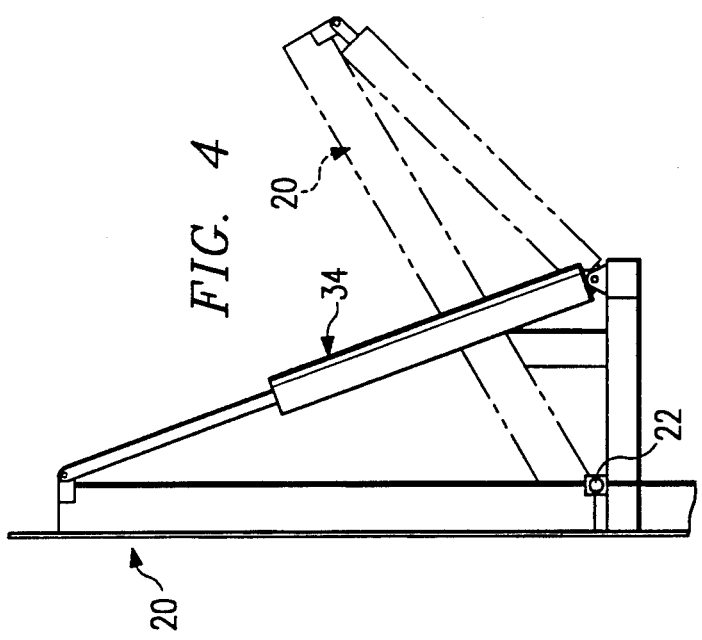

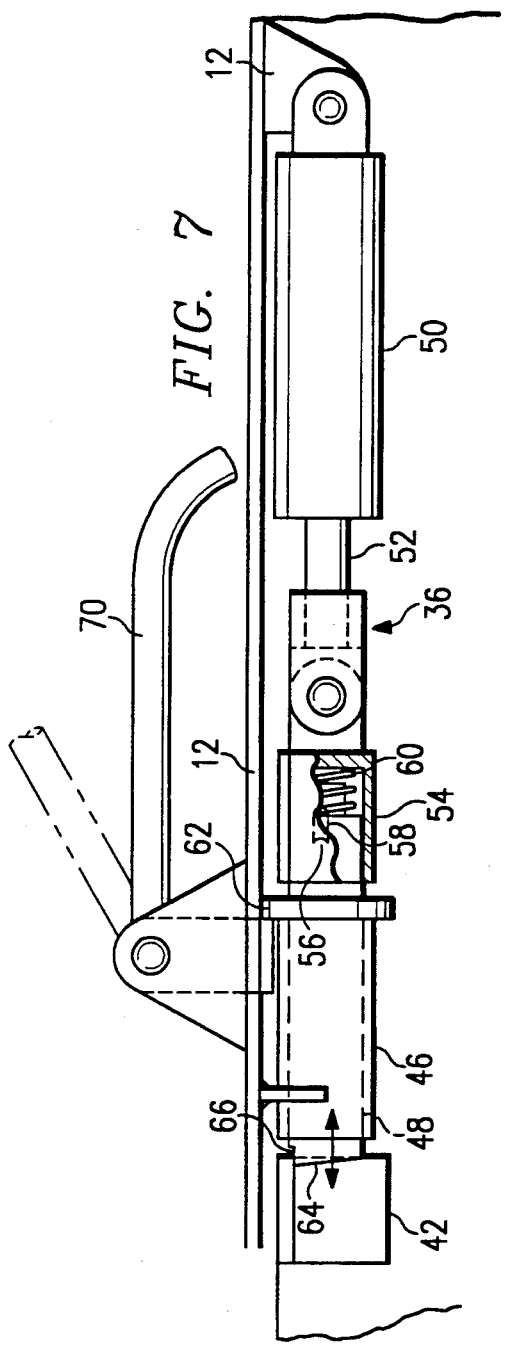
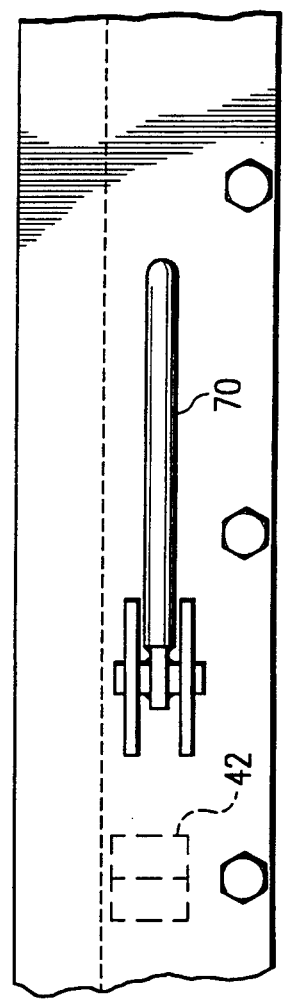
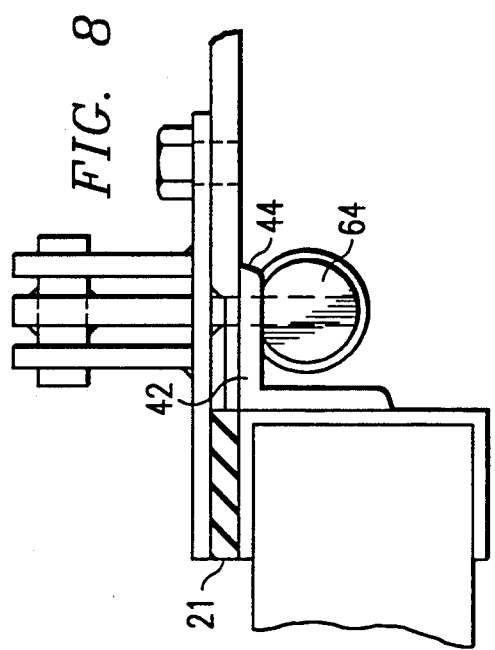
FIG. 7
FIG. 9
FIG. 8

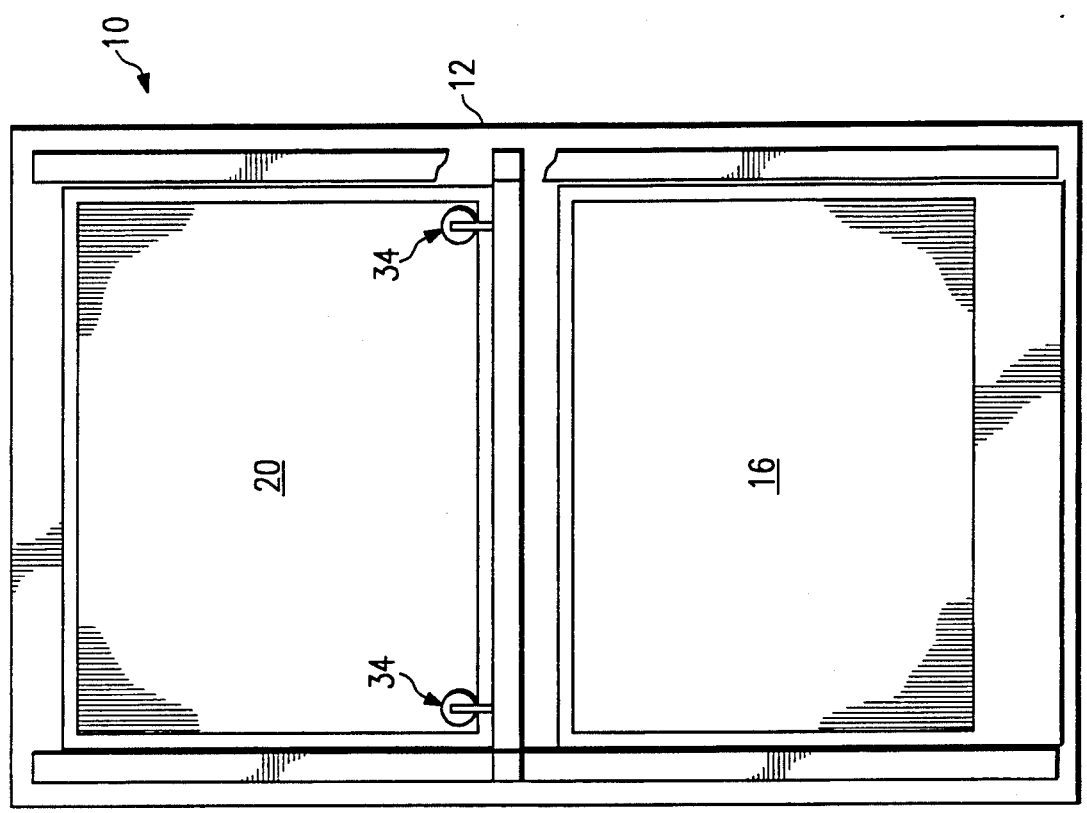
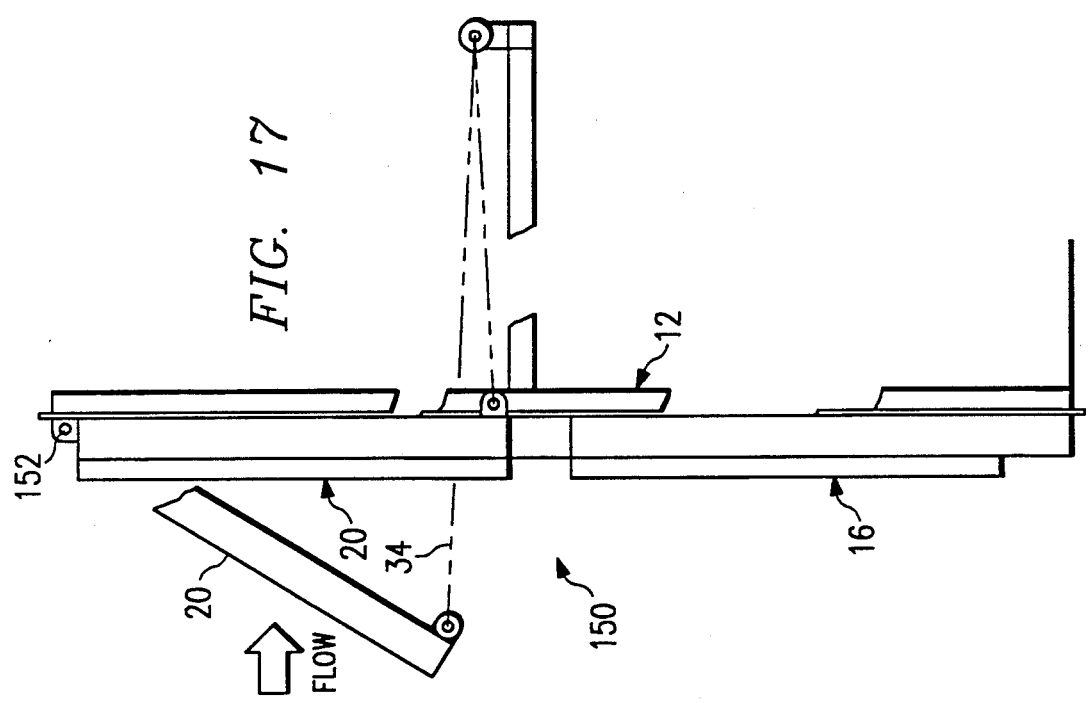

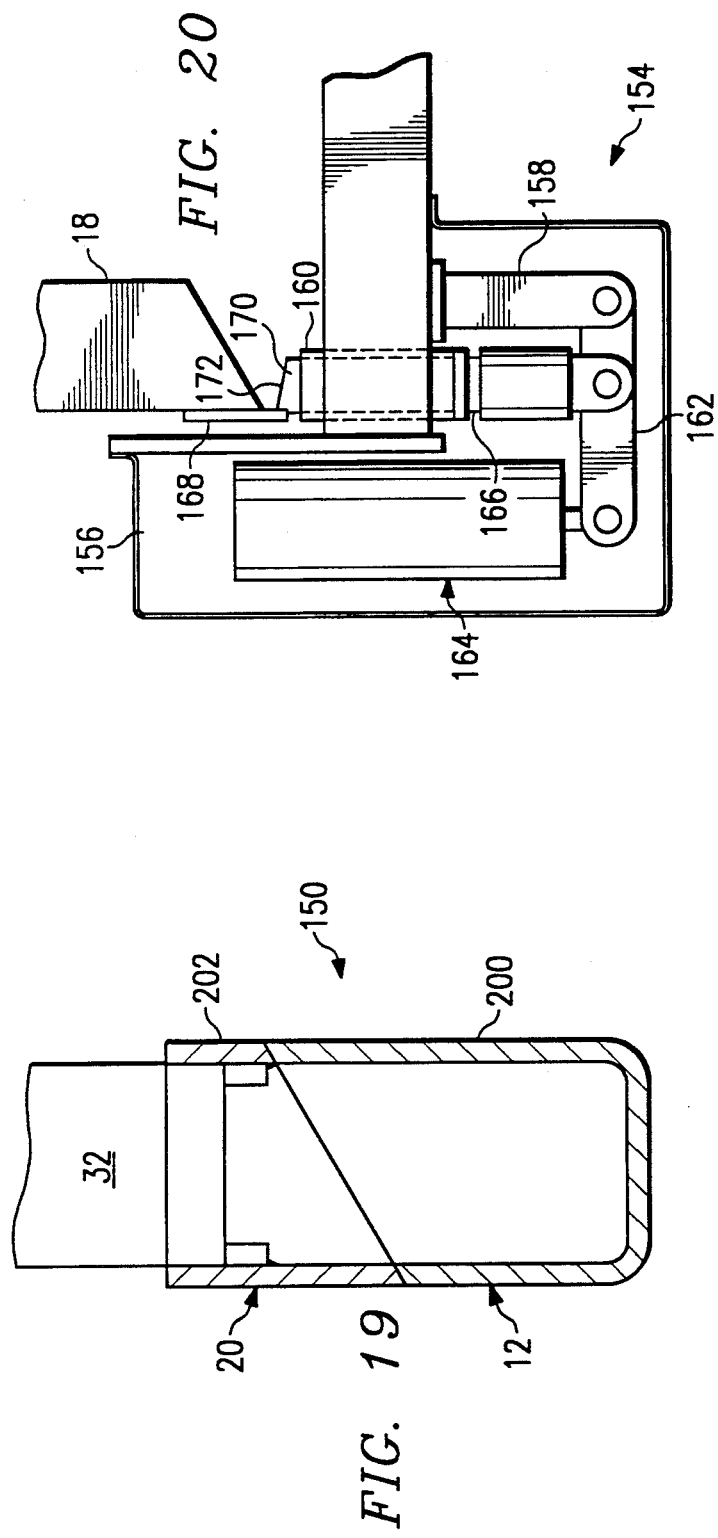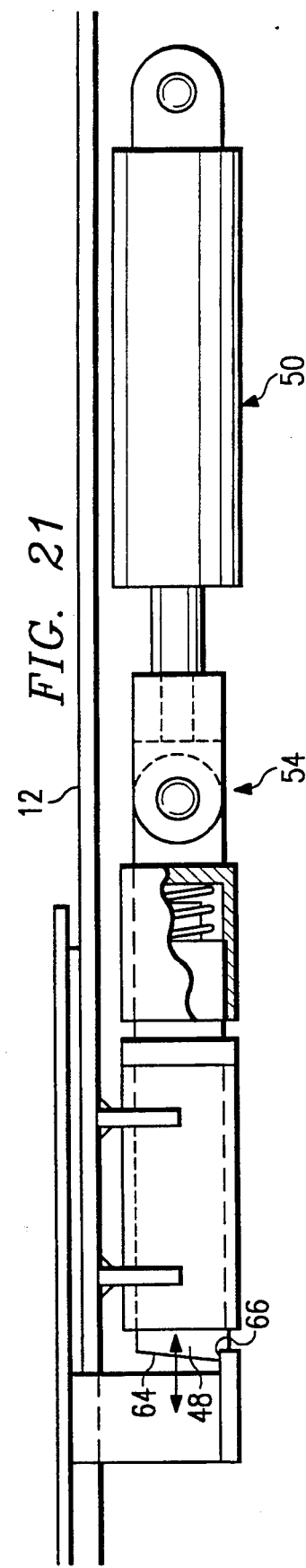

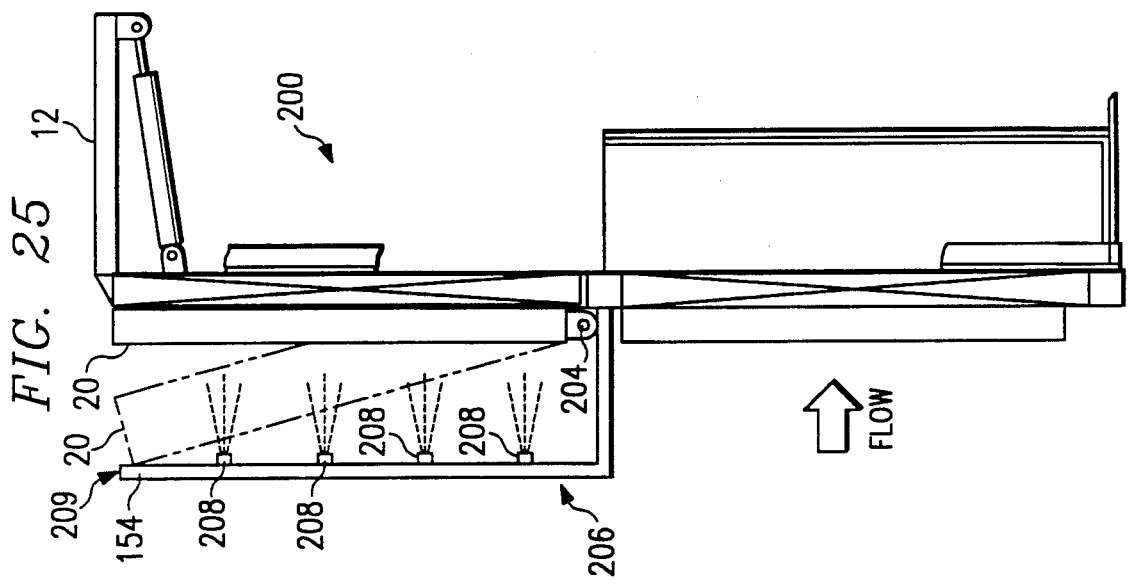

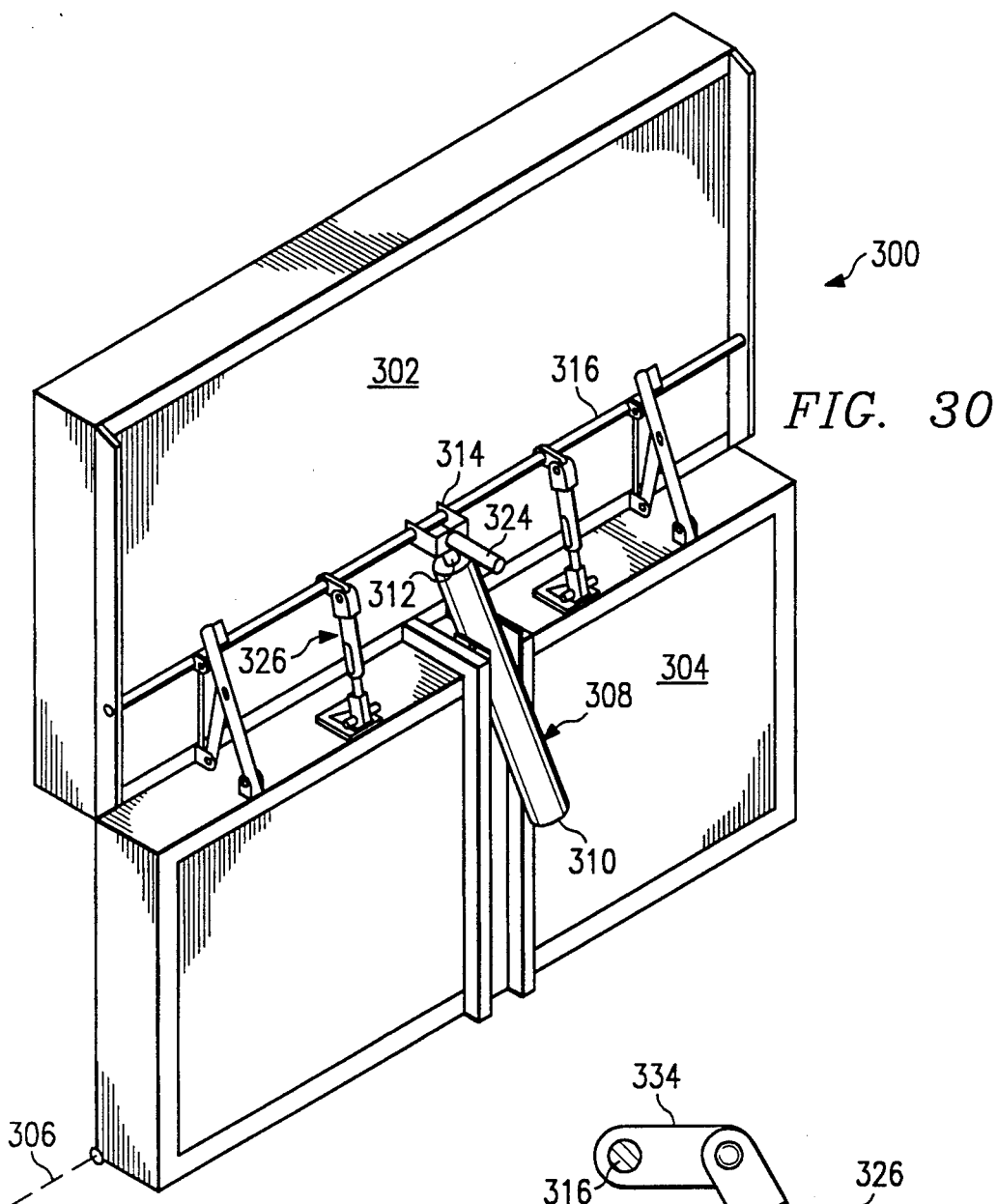
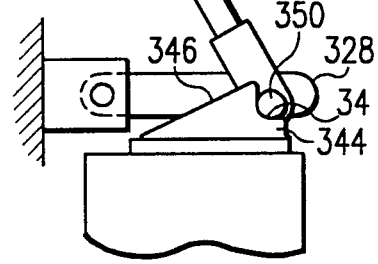

MOISTURE SEPARATOR

CROSS REFERENCE TO RELATED APPLICATION

This application is a continuation-in-part of U.S. patent application Ser. No. 374,145 filed June 30, 1989, now abandoned which in turn was a continuation of U.S. patent application Ser. No. 069,710 filed July 6, 1987, now U.S. Pat. No. 4,854,950 issued Aug. 8, 1989.

TECHNICAL FIELD

This invention relates to a moisture separator for air flow into a marine turbine power plant with air bypass capability.

BACKGROUND OF THE INVENTION

A marine turbine power plant must be provided with large volumes of relatively pure air to operate efficiently and reliably. Typically, air to supply the turbine engine is drawn from intakes on the upper superstructure of the ship to minimize entry of water spray. Further, the air is normally passed through a moisture separator which filters water and other contaminants out of the air flow.

Moisture separators will occasionally become clogged sufficiently to impair the supply of air to the engine. In most applications, this requires the engine to be shut down and the separator cleaned. However, in certain situations, particularly on warships in a combat situation, it may be desirable to bypass the clogged moisture separator to keep the engine running. In a combat situation, the damage done by the entry of dirty bypass air to the engine is far outweighed by the need to keep the engine operational in the short term.

In the past, various designs have been developed for a moisture separator which normally will be positioned in the air flow path, but which can be blown open under certain circumstances to allow air to bypass the moisture separator. An example of such a design is found in U.S. Pat. No. 4,312,645 issued Jan. 26, 1982 and assigned on its face to the Parmatic Engineering Company. In a different area, Carmon U.S. Pat. No. 3,411,272 discloses an air filter for use in a helicopter turbine. However, a need still exists for the development of a design that increases efficiency, reliability and maximizes cost effectiveness.

SUMMARY OF THE INVENTION

In accordance with one aspect of the present invention, an apparatus is provided for filtering air entering a flow passage. The apparatus includes a frame surrounding an opening into the flow passage and a panel mounted to the frame for pivotal motion between a closed position and an open position. The panel includes means for filtering air passing through the panel. Air entering the flow passage passes through the panel when the panel is in the closed position. Air is permitted to bypass the panel when the panel is in the opened position. Structure is provided for powering the panel from the closed to the opened position. Structure is also provided for powering the panel from the open position to the closed position.

In accordance with another aspect of the present invention, a first latching structure is provided to latch the panel in the closed position. A second latching structure is provided to latch the panel in the open position.

In accordance with yet another aspect of the present invention, the panel is mounted to pivot into the air flow when moving from the closed to the opened position. A portion of the frame extends in the direction of flow to provide a mount for the second latching structure to hold the panel in the opened position. The portion can also act as a spray apparatus for spraying fluid on the panel to clean the filter structure in the panel.

BRIEF DESCRIPTION OF THE DRAWINGS

For a more complete understanding of the present invention and the advantages thereof, reference is now made to the following description taken in conjunction with the accompanying drawings, in which:

FIG. 1 is an inlet elevation view of a moisture separator forming a first embodiment of the present invention;

FIG. 2 is a side view in partial cross-section of the moisture separator of FIG. 1;

FIG. 3 is a detailed view of the latch mechanism holding the panel in the closed position;

FIG. 4 is a side view of the mechanism for opening and closing the panel;

FIG. 5 is an outlet elevation of one blow-in panel of the moisture separator;

FIG. 6 is a top view of the blow-in panel of the moisture separator;

FIG. 7 is a top view of the latch mechanism to hold the blow-in panel in the closed position;

FIG. 8 is a side view of the latch mechanism of FIG. 7;

FIG. 9 is a front view of the latch mechanism of FIG. 7;

FIG. 17 is a side view of a moisture separator forming a second embodiment of the present invention with a blow-out panel pivoting to the open position in a direction opposite the air flow;

FIG. 18 is a front view of the moisture separator of FIG. 17;

FIG. 19 is a cross-sectional view of a portion of the blow-in panel in the moisture separator of FIG. 17 illustrating the box drain.

FIG. 20 illustrates the latching mechanism for latching the blow-in panel of the moisture separator of FIG. 17 in the opened position;

FIG. 21 illustrates the detail of the latching mechanism to hold the blow-in panel of FIG. 17 in the closed position;

FIG. 25 is a side view of a moisture separator forming a third embodiment of the present invention;

FIG. 27 is the schematic of the door actuation circuit of the moisture separator of FIG. 25;

FIG. 30 illustrates the separator of FIG. 28 in the closed, filtering position; and FIG. 31 illustrates the latch mechanism used with the separator of FIG. 28.

DETAILED DESCRIPTION

Figure 10:
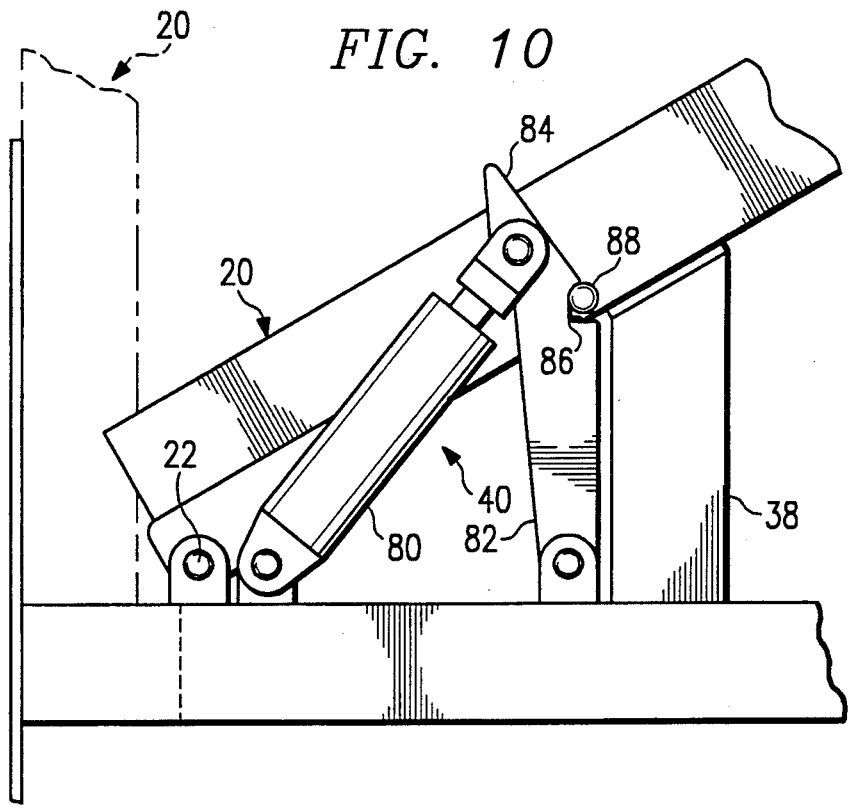
FIG. 10 is a side view of the latch mechanism to hold the blow-in panel in the opened position.

With reference now to FIGS. 1-16, a first embodiment of the present invention is illustrated which forms a moisture separator 10. Moisture separator 10 is specifically designed for use in an engine air inlet system for a marine turbine engine. However, it will be understood that the moisture separator 10 can be used to filter air for any power source, including turbine and diesel propulsion and generating plants for both combustion and cooling air. The moisture separator 10 illustrated is provided with a frame 12 which supports four panels 14, 16, 18 and 20. The lower panels 14 and 16 are fixed. The upper panels 18 and 20 are mounted to the frame 12 by hinges which permit the panels to pivot about an axis 22 between open and closed positions. The moisture separator 10 is mounted to the superstructure of a ship over the air inlet passage to the turbine power plant. With the panels 18 and 20 in the closed position, all air entering the inlet passage must pass through the panels. When the panels 18 and 20 are pivoted to the open position, air can pass through the frame 12 and around the panels 18 and 20 to bypass the panels.

Each of the panels is provided with a filter or agglomerator 24 and a vane pack 26. The filter 24 contains a lightweight frame containing agglomerator media 28 for filtering water and other contaminants from air flowing through the filter. The filter 24 is secured on the panel by four quick release plungers 30 which permit quick removal of the filter for cleaning or replacement. The agglomerator media can be formed by 100% synthetic polyester fibers bonded together with the a special combination of heat resistant and flame retardant chemical bonding agents. Alternatively, a combination of synthetic and metallic filtering materials can be used. The filter is typically about 2" thick, able to withstand temperatures up to 400° F. and has a resiliency of 90% recovery after compression. The vane pack 26 is an array of impingement vane elements 32. Elements 32 have a labyrinth cross section which separates the heavier water or debris particles from the air. The water and debris then falls down through the vane structure by gravity to waste drains provided in the moisture separator. A continuous seal 21, preferably of closed cell silicone foam, seals between the perimeter of the panels and the frame when the panels are closed.

The panels 18 and 20 will normally be in the closed position to filter air passing therethrough. However, if the panels 14, 16, 18 and 20 become clogged, for example by debris or frozen spray, insufficient air may be passing through the moisture separator to supply the power plant. This depravation condition is indicated by a pressure drop downstream of the moisture separator, as the power plant attempts to draw sufficient air to operate. This drop in pressure is sensed by control circuitry described hereinafter to provide pressurized air to a pair of double-acting air cylinders 34 attached between the frame 12 and each side of panels 18 and 20, as best seen in FIG. 4. A latch mechanism 36 (FIGS. 7-9) normally latches each panel 18 and 20 in the closed position. The latch is first deactivated, immediately thereafter the air cylinders 34 are activated to permit the panels 18 and 20 to be powered to the open position by air cylinders 34 where the panels abut a pair of lower stops 38 (at an angle sufficient to allow enough air to by-pass the filters to keep the engines operational, in one design about 60° to vertical). A latch mechanism 40, as best seen in FIG. 10, is employed to hold each panel in the opened position. When the engine air demand is reduced, or the filters cleaned, the latch mechanism 40 is deactivated and air cylinders 34 are driven to power the panels 18 and 20 back to the closed position where they again are latched in the closed position by latch mechanism 36.

With reference now to FIGS. 7-9, the structure of latch mechanism 36 will be described in further detail. Catch 42 is mounted on the blow-in panel and includes an edge 44. A guide 46 is rigidly welded to the frame 12 and receives a cylindrical plunger 48 which is slidable in the direction of the arrows illustrated in FIG. 7. The base of an air cylinder 50 is pivoted to the frame while its piston 52 is pivoted to a manual override assembly 54. One end of the plunger is received within the assembly 54 for limited motion relative thereto in the direction of the arrows as well. The end of the plunger has a pin 56 which rides in a slot 58 in assembly 54 to limit the relative movement of plunger 48 and assembly 54. A spring 60 acts between plunger 48 and assembly 54 to urge pin 56 against the end of slot 58 as illustrated in FIG. 7. Within air cylinder 50 is a spring which forces the piston 52 to extend in the absence of air pressure. In the extended position, the piston forces assembly 54 and plunger 48 to the left as seen in FIG. 7. A collar 62 on plunger 48 limits the motion of the plunger in that direction. The end of plunger 48 opposite the assembly 54 has a ramp 64 and a notch 66. Notch 66 contacts the underside of catch 42 to hold the panel in the closed position. To release latch mechanism 40, air pressure is provided to cylinder 50 to retract the piston 52 against the force of the spring within the cylinder. This causes plunger 48 to withdraw from contact with catch 42 and allows the panel to move from the closed position. A manual open lever 70 can be pivoted to the frame as shown to override the operation of cylinder 50 by contacting collar 62 and moving plunger 48 relative to assembly 54 by compressing spring 60 to release the catch. Such a manual release can be used should cylinder 50 become frozen. The latch 36 will operate automatically as the panel moves to the closed position as the plunger will deflect through contacts between edge 44 and ramp 64 until notch 66 catches against the underside of the catch.

With reference now to FIG. 10, the components of the latch mechanism 40 will be described. The base of a single acting air cylinder 80 is pivoted to the frame proximate the lower stop 38. A catch 82 is also pivoted to the frame at one end, and to the piston of cylinder 80 at its opposite end. The catch 82 is formed with a ramp surface 84 and a notch 86 to cooperate with a locking pin 88 on the side of the blow-in panel. An internal spring within the cylinder 80 urges the piston of the cylinder to move to the extended position. As the blow-in panel is pivoted to the opened position, the pin 88 contacts ramp surface 84 to pivot the catch in the counter-clockwise direction as seen in FIG. 10 until the pin is received in notch 86 where the force of the spring within air cylinder 80 locks the panel in the opened position against the lower stop 38. If pressurized air is provided to cylinder 80 to retract the piston, the catch will pivot in the counter-clockwise direction away from the pin, releasing the pin and permitting the panel to be pivoted toward the closed position. Mechanism 40 can be released manually as well.

Figure 11:
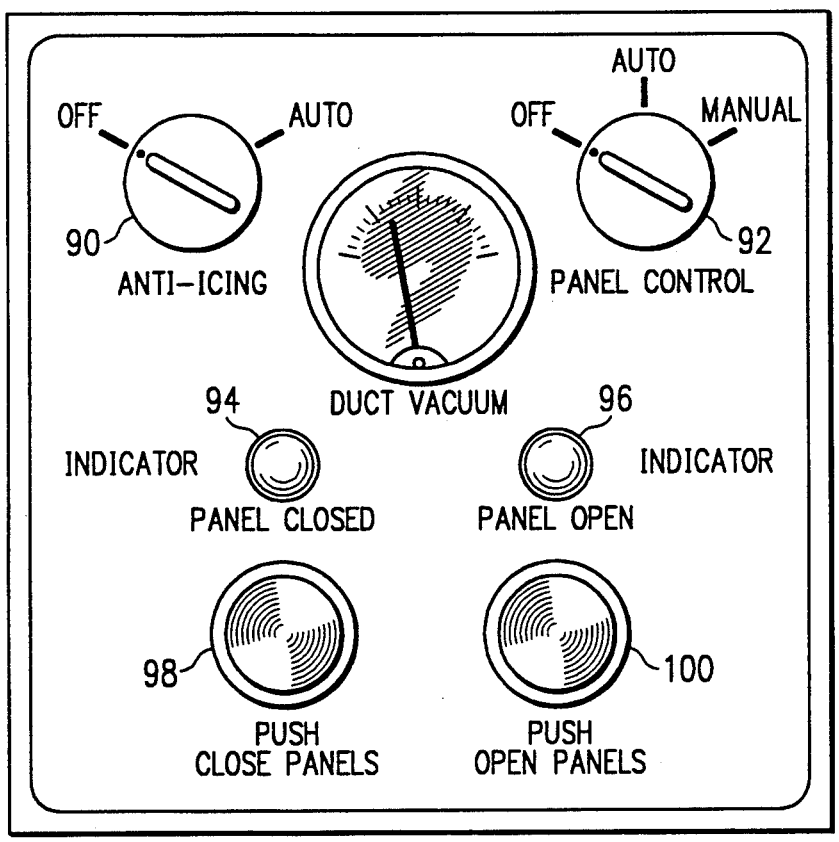
FIG. 11 is an illustrative view of the control panel of the moisture separator.
Figure 12:
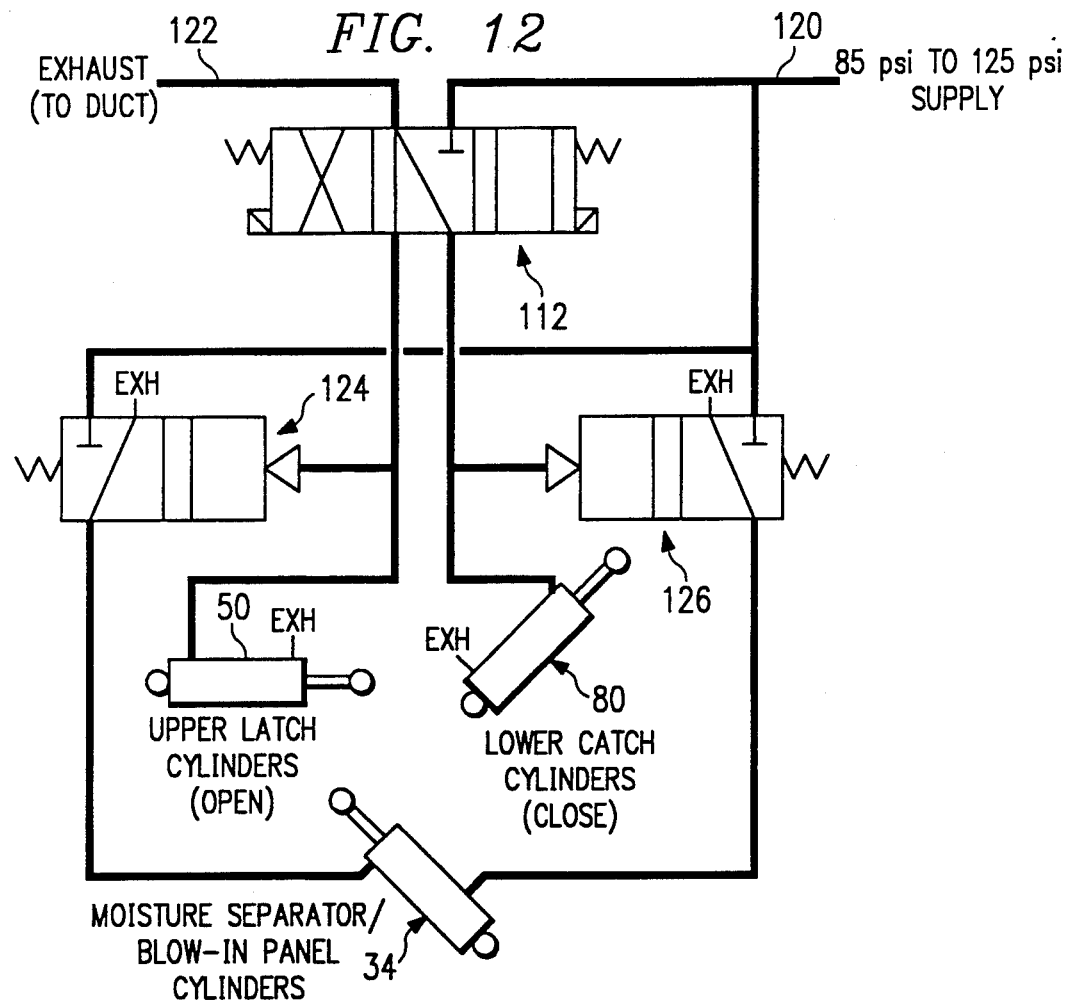
FIG. 12 is the circuit diagram for pneumatic operation of the moisture separator.
Figure 13:
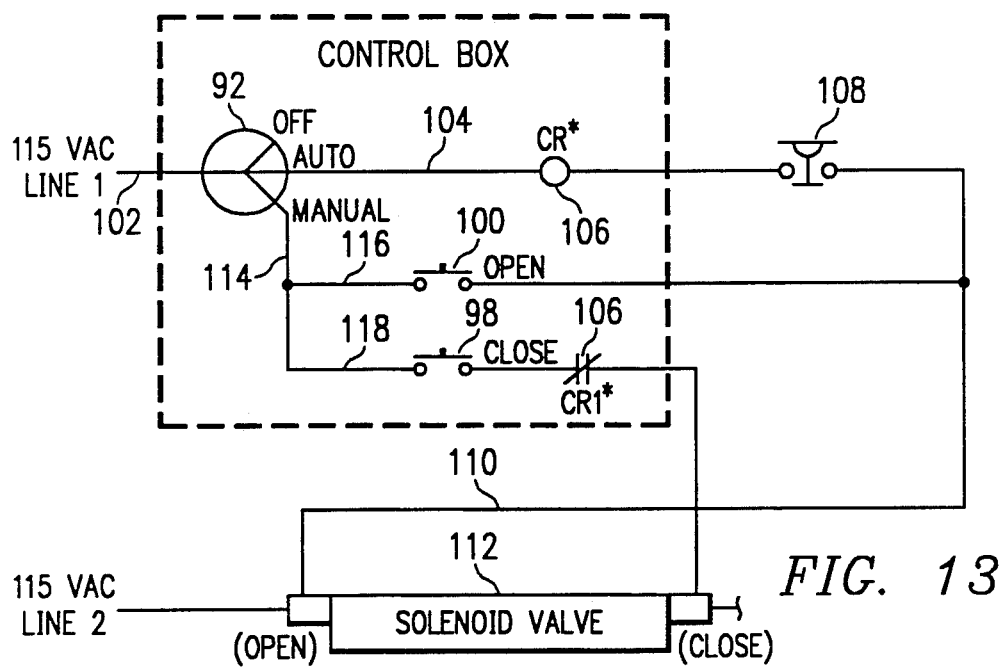
FIG. 13 is a schematic of the panel set actuation circuit for the moisture separator.

With reference now to FIGS. 11–13, the operating circuits of the moisture separator will be described. The control panel illustrated in FIG. 11 illustrates a switch 90 for activating the anti-icing circuit of the moisture separator and a switch 92 for selecting manual or automatic operation of the blow-in panels, or deactivating the system. An indicator light 94 is lit when the blow-in panels are closed. An indicator light 96 is illuminated when the blow-in panels are opened. A push button 98 can be operated in certain circumstances to close the blow-in panels. A push button 100 can be operated to open the blow-in panels.

With reference to FIG. 13, power is provided to switch 92 through line 102. In automatic mode, line 102 is connected to line 104 which opens normally closed core relay (CR) 106. A vacuum sensing switch 108 is provided in line 104. Switch 108 senses the vacuum downstream of the moisture separator and will close when the pressure drops to a level indicating excessive blockage in the moisture separator. When switch 108 closes, line 102 is connected to line 110 to operate a solenoid valve 112 to open the blow-in doors as will be described hereinafter.

In the manual mode, power line 102 is connected to line 114. Line 114 splits into lines 116 and 118. Line 116 connects with line 110 through push button switch 100. Closing of switch 100 will also activate the solenoid valve to open the blow-in doors. Line 118 connects to the solenoid valve 112 to close the blow-in doors through push button switch 98 and the contacts of relay 106. If power is provided to line 104 when operation is in the automatic mode, the contacts in relay 106 will open, preventing closure of the blow-in doors by pushing switch 98.

With reference now to FIG. 12 the pneumatic operation of the blow-in panels will be described. High pressure air (or pure Nitrogen to reduce the risk of water vapor in the air freezing and jamming the cylinders and valves) is provided through a line 120, preferably at a pressure of 85–125 psi. Line 122 forms an exhaust line. In the neutral position of solenoid valve 112, the line 120 is blocked and latching cylinders 50 and 80 are exhausted to the atmosphere. When solenoid valve 112 moves to the open position, line 120 is connected to cylinder 50 to unlatch mechanism 36 and to a relay valve 124. A 75 psi spring holds the relay valve closed while the cylinder 50 unlatches mechanism 36. When the piston of cylinder 50 is retracted and mechanism 36 unlatched, pressure builds up in the supply line sufficiently to overcome the 75 psi bias on valve 124, activating valve 124 to connect line 120 to cylinders 34 to move the blow-in doors from the closed position to the opened position. After the blow-in panels have moved to the open position, air will pass around the panels in an unrestricted flow which should deactivate the vacuum sensing switch 108. When switch 108 is deactivated, the solenoid valve 112 returns to the neutral position and the panels are held in the open position solely by latch mechanism 40.

The panel can be closed either manually or by pushing the close push button 98. By pushing button 98, solenoid valve 112 is activated to connect line 120 to cylinder 80 to unlatch the panels and to relay valve 126. Again, cylinder 80 is operated to unlatch the panel before the 75 psi bias force on valve 126 is overcome to connect the supply line 120 to the opposite chamber of cylinders 34 to power the panels from the opened position to the closed position where they are latched in the closed position by latching mechanism 36.

Figure 14:
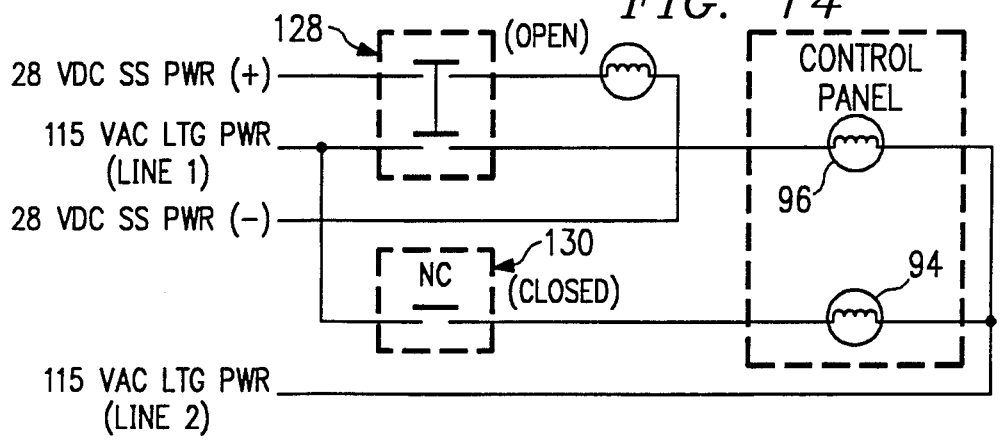
FIG. 14 is a schematic of the indication circuit for propulsion of the moisture separator.
Figure 15:
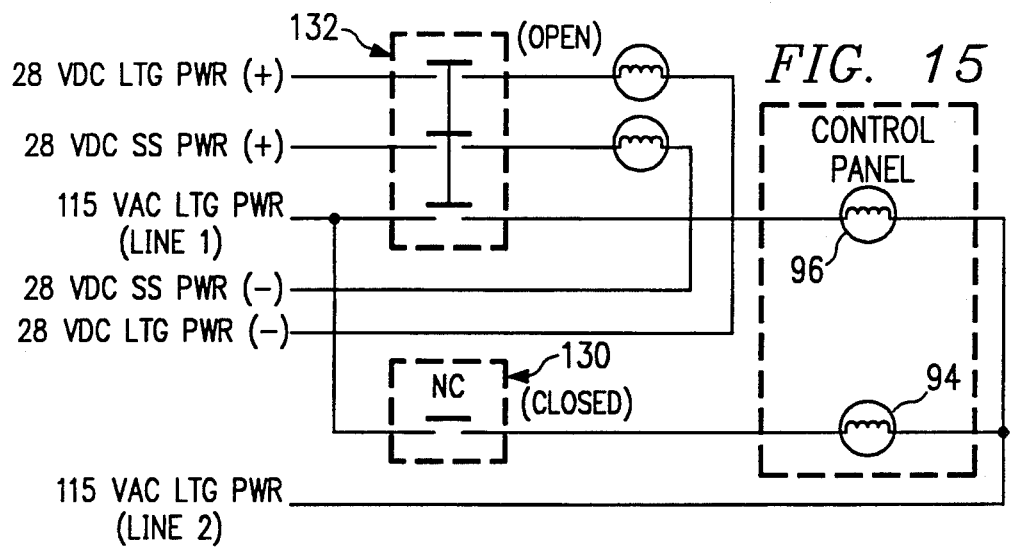
FIG. 15 is a schematic of the indication circuit for ship service for the moisture separator.

FIGS. 14 and 15 illustrate the power circuits for the indicator lights 94 and 96 in the control panel and other lights, as required. Proximity switches 128, 130 and 132 sense the open and closed positions of the blow-in panels to provide power to respective lights.

Figure 16:
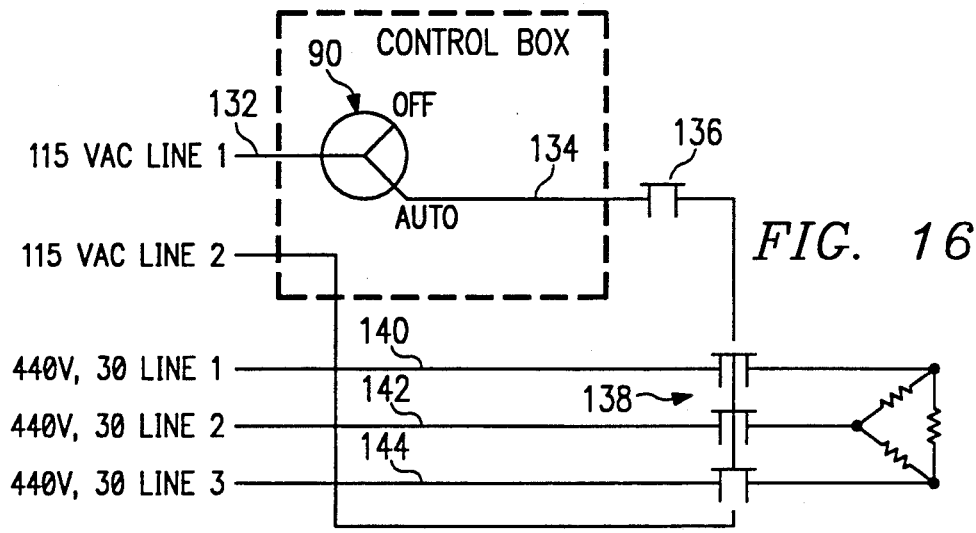
FIG. 16 is a schematic of the anti-icing circuit for the moisture separator.

FIG. 16 illustrates the anti-icing circuit of the moisture separator 10. When anti-icing switch 90 is positioned for operation, power is provided from power line 132 to line 134 containing a thermostatic switch 136. Switch 136 closes at a predetermined environmental temperature, such as 40° F., to activate a three-phase relay 138. Three-phase relay 138, in turn, provides three-phase power through lines 140, 142 and 144 to resistance type heat trace in the blow-in panel seals 21 sealing between the panels and frame, cylinders 34, 50 and 80 and moisture drain tanks in the frame to prevent icing. The heat trace is preferably self-limiting in temperature, usually not to exceed 250° F. Also, the thermostatic switch closing temperature is preferably adjustable to suit specific environments.

With reference now to FIGS. 17–24, a moisture separator 150 forming a second embodiment of the present invention is illustrated. Many components of moisture separator 150 are identical to those of moisture separator 10 and are identified by the same reference numeral. However, in moisture separator 150, the panels 18 and 20 are pivoted at their upper end to pivot about an axis 152 from the closed position outward against the direction of air flow to the open position, preferably through an angle of about 30°. The cylinders 34 operate between frame 12 and the lower edge of the panels. An advantage to the design of moisture separator 150 arises if debris, such as ice, is knocked off of or dislodged from panels 18 and 20 when in the opened position. With moisture separator 10, such dislodged material would fall into the air passage leading to the power plant. In contrast, the outward position of the panels in the moisture separator 150 would induce such material to fall exterior the passage and reduce the likelihood of the material entering the power plant.

FIG. 19 illustrates one drain configuration for moisture separator 150. A portion of frame 12 forms a drain channel 200. At the lower end of the vane elements 32 on panels 18 and 20, a portion 202 is formed. The channel 200 and portion 202 have mating surfaces cut on an angle 30° from horizontal which contact when the panels 18 and 20 are closed. Moisture and debris separated from the air flow fall through vane elements 32, past portion 202 and into the drain channel 200. Channel 200 has a passage along its length to drain the channel through the frame for disposal.

FIG. 20 illustrates a modified latch mechanism 154 to hold the panels 18 and 20 in the open position. Bracket 156 extends outwardly from the frame 12 to mount a fulcrum bar 158 and guide 160. A lever 162 is pivoted at one end to the fulcrum bar 158. An air cylinder 164 is pivoted at its base to the bracket 156 with its piston pivoted to the other end of the lever 162. Intermediate the ends of the lever, a plunger 166 is pivoted thereto and slides within guide 160. The cylinder 164 is provided with an internal spring to urge the plunger 166 upward as seen in FIG. 20. As the panel moves to the open position, catch 168 on the panel will move up the ramp 170 of the plunger until the catch is secured within notch 172 of the plunger. The mechanism can release the panel by providing air under pressure to cylinder 164 to move the plunger 166 downward, releasing catch 168.

The latch mechanism 174 employed to hold panels 18 and 20 in the closed position (see FIG. 21) within moisture separator 150 is in most regards identical to latch mechanism 36, but is adapted to the outward motion of the panels.

Figure 22A:
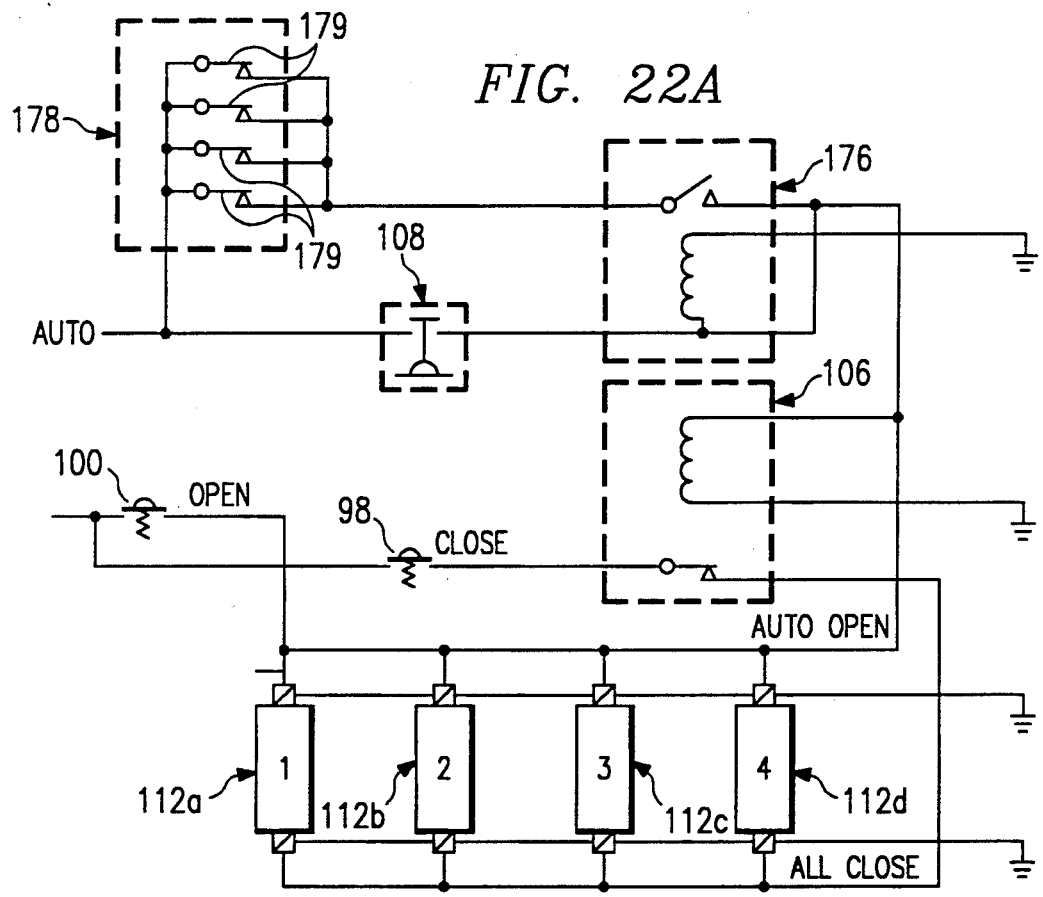
FIGS. 22A and 22B are the schematic of the door actuation circuit for the moisture separator of FIG. 17.
Figure 22B:
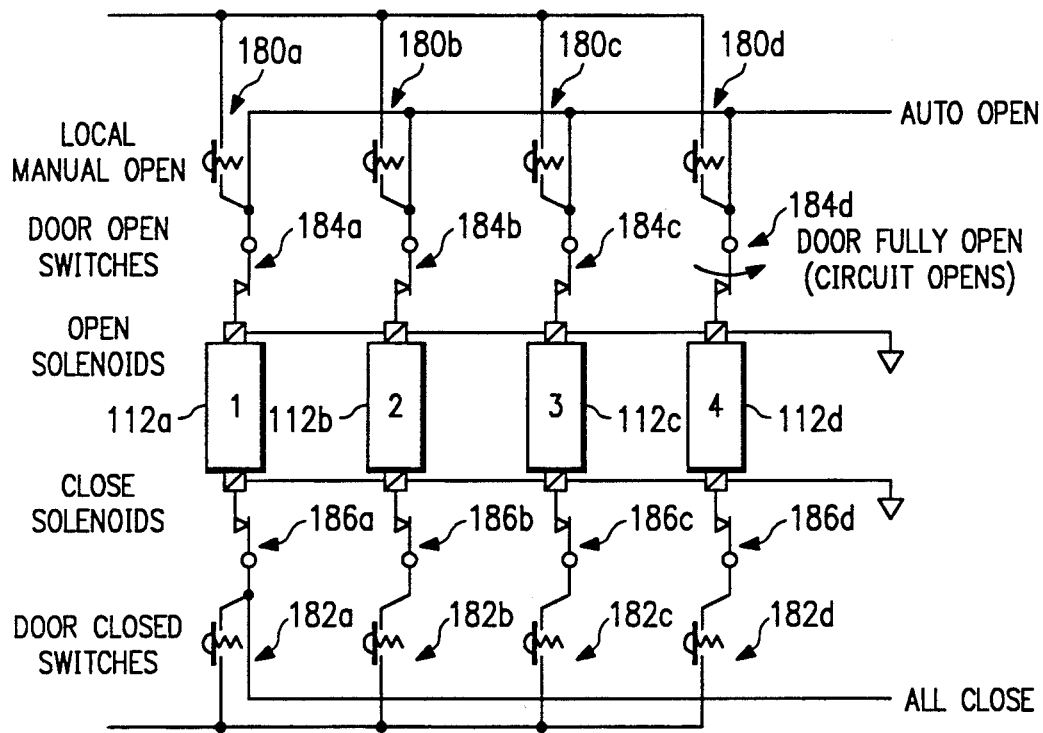

The operating circuit of moisture separator 150 is similar to that for moisture separator 10, as illustrated in FIGS. 22A and 22B. The circuit illustrated in FIGS. 22A and 22B is capable of operating solenoid valves 112a, 112b, 112c, and 112d for four separate panels with a single vacuum sensing switch 108. Added to the circuit of FIGS. 22A and 22B is an actuate relay 176 which connects the solenoid valves to the power source through a circuit 178 formed by proximity switches 179 at each panel connected in parallel. As each panel is opened, the associated proximity switch will open. Only when all panels are open, and all switches 179 are open, will power cease being delivered to the solenoid 112 to ensure all the panels will be fully opened during an opening sequence, despite the possible opening of the vacuum switch 108 by the pressure increase as the panels begin to open.

The circuit of FIGS. 22A and 22B also provides for local manual actuation of each panel separately through activation of individual open switches 180a, b, c and d or activation of individual door closed switches 182a, b, c or d. When all four panels are closed, relay operating switches 184a, b, c and d operate to isolate the switches 180 from their respective solenoid. When all panels are closed, a relay opens switches 186a, b, c and d to separate switches 182 from their respective solenoids. Mechanisms 154 and 174 can be manually released as well.

Figure 23:
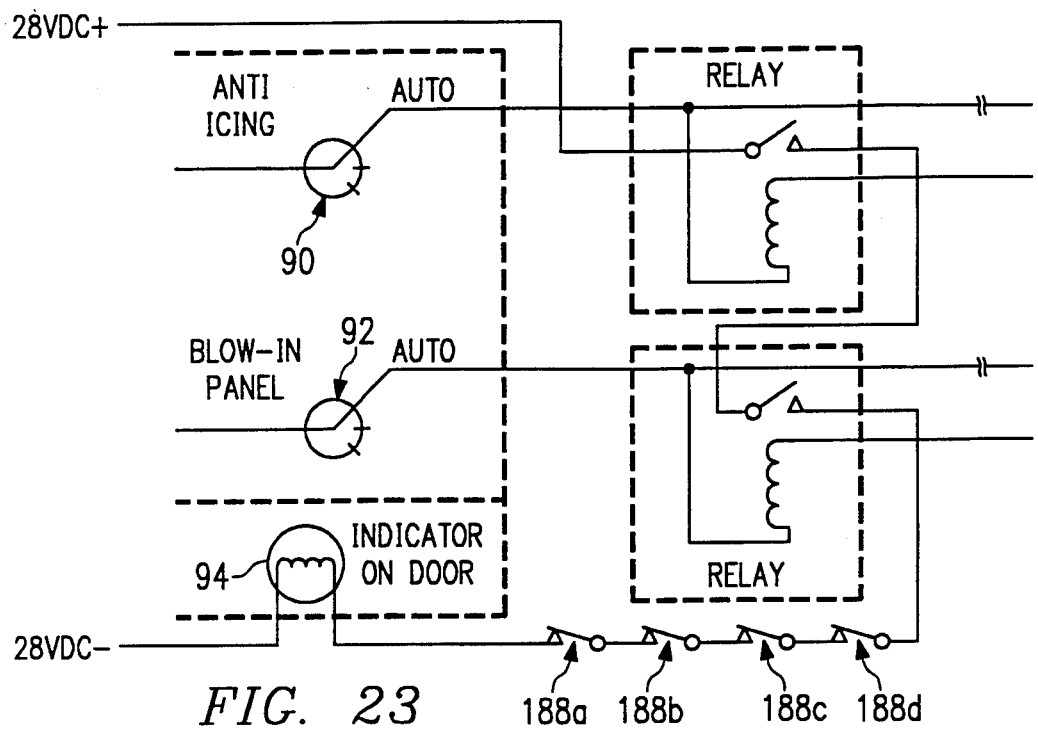
FIG. 23 is a schematic of the panel closed indication circuit for the moisture separator of FIG. 17.
Figure 24:
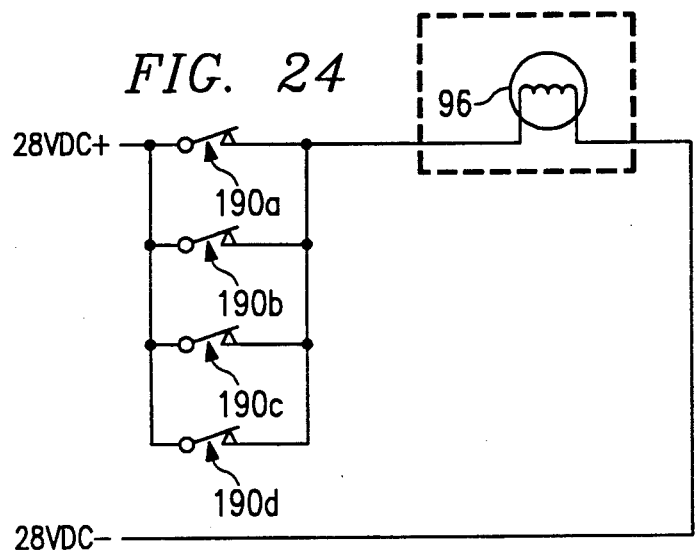
FIG. 24 is the panel open indication circuit for the moisture separator of FIG. 17.

FIGS. 23 and 24 illustrate the indicator light operating functions for the four panel circuit. The closed indication light 94 is only activated when all four panels are closed, as represented by the closed condition of four proximity switches 188a, b, c, and d in series and when both the switch 90 and switch 92 are in automatic mode. However, when any panel is open, as indicated by a proximity switch 190a, b, c, or d associated with each panel, the indicator lamp 96 is lit.

Figure 26:
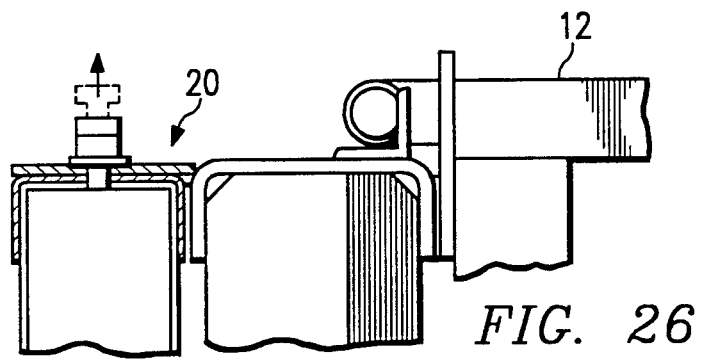
FIG. 26 is a detail of the moisture separator of claim 25.
Figure 29:
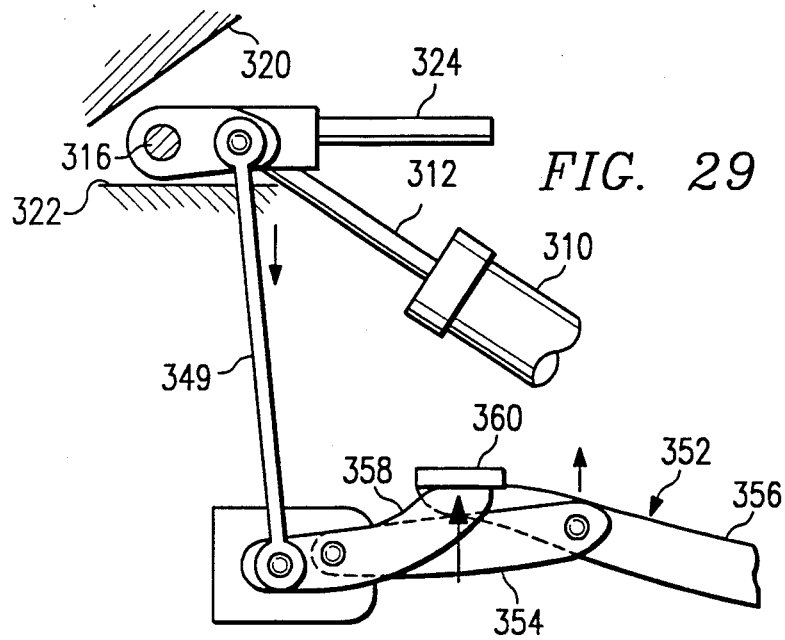
FIG. 29 is an illustrative view of the cylinder assembly and hinge assembly used with the separator of FIG. 28.
Figure 28:
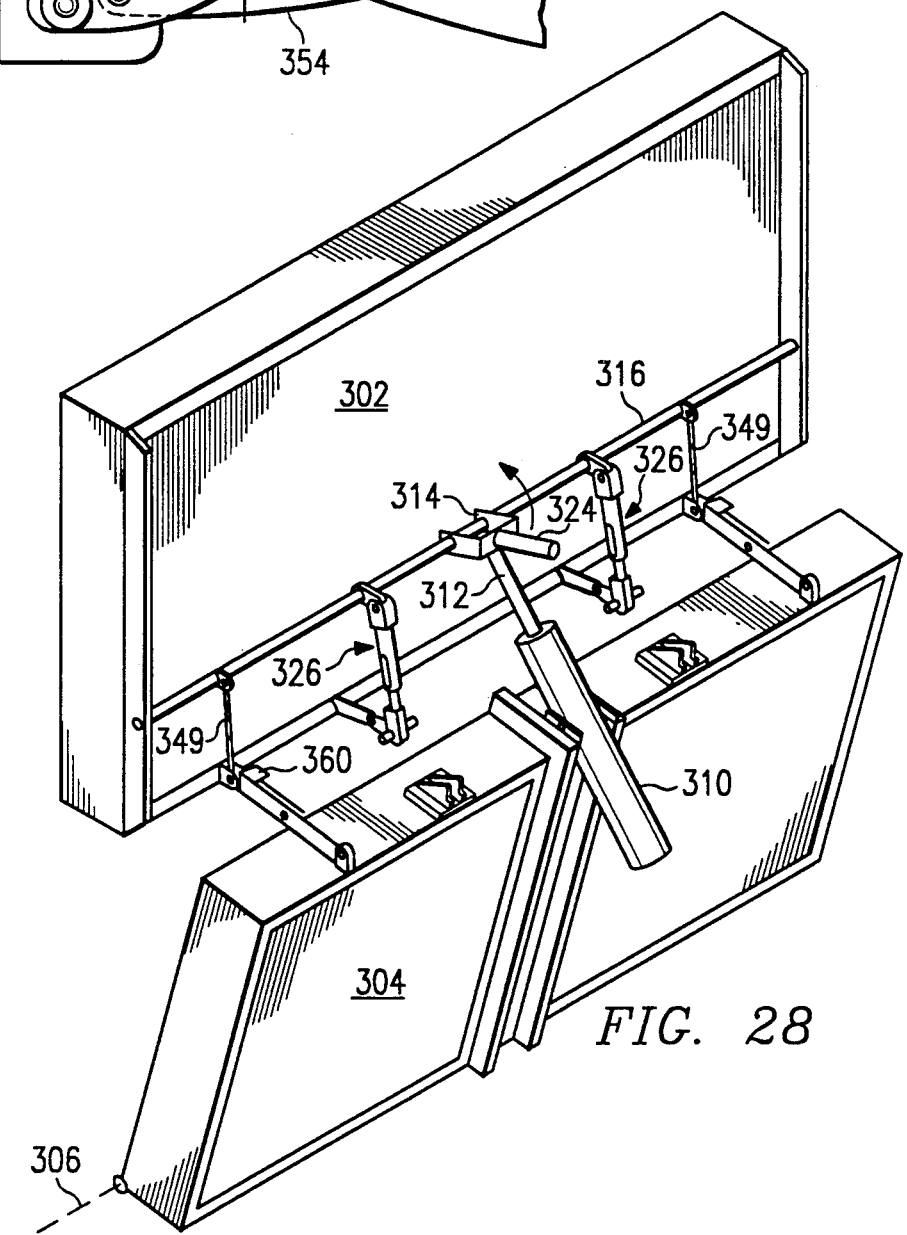
FIG. 28 is a perspective view of another embodiment of a moisture separator in accordance with the present invention with the panel in the open, bypass position.

FIGS. 25-27 illustrate a moisture separator 200 forming a third embodiment of the present invention. In this embodiment, many elements remain identical to those previously discussed with respect to moisture separator 10 and 150. However, the panels 18 and 20 pivot about an axis 204 along their lower edge and the panels pivot from the closed position outward to the open position against the air flow direction, preferably through an angle of about 15°. An anti-icing or water spray manifold 206 extends outward against the air flow direction from the frame 12 and vertically upward along the entire length of the panels, with spray nozzles 208 distributed at uniform distances along the vertical height of the manifold. De-icing fluid under pressure can be provided to the manifold 206 and sprayed on to the panels for de-icing with nozzles 208. Alternately, water or other cleaning fluid can be sprayed on the panels from nozzles 208 to clean the panels of salt encrustation or other debris. The upper end 209 of manifold 206 also is provided with latch mechanism 154 to hold the panel in the open position. Thus, manifold 206 acts in a dual function manner to provide de-icing spray and also hold the panel open.

With reference now to FIGS. 28-31, a moisture separator 300 is illustrated forming another embodiment of the present invention. Many of the elements of moisture separator 300 are identical in construction and function with the previously discussed moisture separators. Separator 300 includes a fixed panel 302 and a movable panel 304 which is pivoted for movement between a filter position and a bypass position about an axis 306 at the bottom of panel 304. The panel 304 is moved between the filter and bypass positions by the action of a single double acting air cylinder assembly 308 with the cylinder 310 itself mounted on the movable panel 304.

The piston rod 312 extends from the cylinder 310 and is pivotally mounted to a lever 314. The base of the lever 314 is mounted to a rod 316 which is pivotally mounted on the frame 318 of the separator 300 behind the fixed panel 302. The lever 314 is pivotal between an open stop 320 mounted on the frame 318 and a closed stop 322 mounted on the frame 318. Lever 314 also includes a handle 324 extending outward from the point of pivotal mounting of the piston rod 312 thereto which allows hand actuation of the lever. As can be appreciated, if pressurized air is entered into the cylinder 308 to extend the piston rod 312, the lever 314 is moved against the open stop 320, and further movement of the piston causes the panel 304 to move to the open, bypass position. Entry of pressurized air within the cylinder 308 to retract the piston rod 312 causes the lever 314 to abut the closed stop 322 whereupon further inward movement of the piston rod 312 draws the panel 304 into the closed, filtering position. As the lever 314 moves between the stops 320 and 322, the rod 316 connected thereto also rotates about a common axis with the lever.

The panel 304 is held in the closed, filtering position by a pair of latch mechanisms 326. Each latch mechanism 326 includes a latch 328 which is pivoted at one end to the frame 318 immediately above the panel 304. The latch 328 is urged in the direction to latch the panel 304 by a latch spring assembly 330. The latch spring assembly 330 includes a barrel 332 pivoted at its upper end to an extension 334 secured on the rod 316. A member 336 extends out of the barrel 332 and is pivoted at its free end to the latch 328. A spring 338 within the barrel 332 acts to extend the member 336 from the barrel to the extent permitted by opposed pins 340 on the member 336 running along opposed slots 342 in the barrel 332. The latch mechanism 326 cooperates with a bracket 344 on the panel 304. Bracket 344 includes a ramp surface 346 and notches 348 to receive pins 350 on the latch 328 which locks the latch mechanism with the bracket.

As can be readily understood from the drawing, the latch mechanism 326 is designed so that when the cylinder 308 is activated to move piston 312 into the cylinder to move the panel to the closed, filtering position, the rod 316 pivots to move extension 334 to a position whereby the latch mechanism tightly engages the bracket 344. If the panel 304 is moving to the closed position in this configuration the pins 350 ride up the ramp surface 346 until the notches 348 are engaged, with the spring 338 being compressed to the degree necessary to permit the member 336 to move into barrel 332 as the pins 350 ramp up surface 346. When the panel is to be moved to the open, bypass position, the cylinder 308 is activated to move lever 314 against the open stop 320, which moves the extension 334 so that the pins 350 move out of engagement with the bracket 344 to unlock the panel.

The panel 304 is limited in its open position by a pair of hinge assemblies 352 pivoted between the frame 318 and the panel 304. As can be seen, each hinge assembly includes a first hinge 354 pivoted to the frame and a second hinge 356 pivoted to the panel, with hinges 354 and 356 pivoted to each other. In the closed position, the hinge assemblies are also closed. However, when the panel 304 moves to the open position, the hinge assemblies open until the first and second hinges 354 and 356 are parallel, which defines the maximum open bypass position of the panel 304. In the absence of an external force, the open hinge assemblies 352 can prevent the panel 304 from closing. Therefore, a lever 358 is pivoted near its center to the same point on the frame as hinge 354. Each lever 358 is connected to rod 316 through member 349 so that as the piston 312 moves the lever 314 against the closed stop 322, the lever 358 is pivoted against an extension 360 mounted on each of the first hinges 354 which begins to close each hinge assembly, allowing the cylinder 308 to move the panel 304 back to the closed, filtering position.

FIG. 27 illustrates the control circuit for the moisture separator 200 using six blow-in panels and a single solenoid valve 112 to operate all six panels and is substantially identical to the circuits described above. The circuit of FIG. 27 does include a set of normally closed open door proximity switches 210 and a door open relay 212. Switches 210 will maintain power to the solenoid 112 until all proximity switches open, indicating all six panels are opened and latched.

While several embodiments of the invention have been illustrated in the accompanying drawings and described in the foregoing Detailed Description, it will be understood that the invention is not limited to the embodiments disclosed, but is capable of numerous rearrangements, modifications and substitutions of parts and elements without departing from the scope and spirit of the invention.

We claim:

1. An apparatus for filtering air entering a flow passage, comprising:
    a frame surrounding an opening into the flow passage;
    a panel mounted to said frame for pivotal motion between a closed position and an open position, the panel including means for filtering air passing through the panel, air entering the flow passage passing through the panel when the panel is in the closed position, air being permitted to pass through the frame and around the panel when the panel is in the opened position;
    a double acting air cylinder having a cylinder and a piston, said cylinder being mounted on the panel;
    a lever assembly mounted on said frame and pivotal between an open stop and a closed stop on said frame, the piston of said air cylinder being pivotally connected to said lever assembly;
    at least one latching mechanism mounted on said frame for latching the panel in the closed position, said latching mechanism being operated by said lever assembly; and
    at least one hinge assembly mounted between said frame and said panel to limit the movement of the panel into the open position.

2. The apparatus of claim 1 further comprising a manifold mounted to the frame and extending along the panel for providing cleaning fluid to the panel.

3. The apparatus of claim 1 further including means for sensing the air pressure downstream of the apparatus and for activating said air cylinder when the pressure falls below a predetermined level indicating blockage of air flow through the panel.

* * * * *